(12) United States Patent
Voyer

(10) Patent No.: US 6,873,856 B2
(45) Date of Patent: Mar. 29, 2005

(54) SYSTEM FOR CONTROLLING THE TRANSMISSION POWER OF A BASE STATION WITH WHICH A NUMBER OF MOBILE STATIONS ARE IN COMMUNICATION

(75) Inventor: Nicolas Voyer, Rennes (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 544 days.

(21) Appl. No.: 09/778,746

(22) Filed: Feb. 8, 2001

(65) Prior Publication Data

US 2001/0027112 A1 Oct. 4, 2001

(30) Foreign Application Priority Data

Feb. 29, 2000 (FR) .............................................. 00 02726

(51) Int. Cl.[7] .................................................. H04Q 7/20
(52) U.S. Cl. .......................... 455/522; 455/69; 455/68; 370/318
(58) Field of Search ............................ 455/522, 68, 69, 455/13.4, 436, 442, 437, 134, 135; 370/318, 316, 320, 322, 331, 323

(56) References Cited

U.S. PATENT DOCUMENTS 5,893,035 A * 4/1999 Chen .......................... 455/522
6,064,659 A * 5/2000 Rohani et al. ............... 370/318
6,173,162 B1 * 1/2001 Dahlman et al. ............. 455/69

FOREIGN PATENT DOCUMENTS

| EP | 0 907 296 | 4/1999 |
|---|---|---|
| WO | WO 95/24102 | 9/1995 |
| WO | WO 00/01087 | 1/2000 |
| WO | WO 00/03487 | 1/2000 |

\* cited by examiner

Primary Examiner—Nay Maung
Assistant Examiner—Shaima Q. Aminzay
(74) Attorney, Agent, or Firm—Oblon, Spivak, McClelland, Maier & Neustadt, P.C.

(57) ABSTRACT

A system for controlling the transmission power of a base station configured to communicate with mobile stations, wherein the base station includes power command units configured to receive signals intended for mobile stations and power command signals sent by mobile stations, summation units configured to form sub-composite signals of input signals having a given priority level transmitted by the power command units, attenuation units configured to attenuate the sub-composite signals transmitted by the summation units by applying attenuation coefficients, and a summer configured to form a composite signal to be transmitted to mobile stations from the signals transmitted by the attenuation units.

11 Claims, 3 Drawing Sheets

SYSTEM FOR CONTROLLING THE TRANSMISSION POWER OF A BASE STATION WITH WHICH A NUMBER OF MOBILE STATIONS ARE IN COMMUNICATION

BACKGROUND OF THE INVENTION

Field of the Invention

The present invention concerns a system for controlling the transmission power of a base station with which a number of mobile stations are in communication.

In a telecommunications system for mobile telephones (or mobile stations), the signal which is transmitted by a base station serving a cell is a composite signal composed of the sum of the signals respectively dedicated to the mobile stations which are situated in the coverage of said cell and specific signals intended for all the mobile stations. All these signals are sent multiplexed. For example, as is the case in a CDMA telecommunications system, all these signals are sent at the same time, at the same frequency, multiplexed by means of spread codes.

FIG. 1 depicts schematically the sending section of a base station of such a telecommunication system. It can be noted that the signals $e_1$ to $e_N$ intended for the different mobile stations are summed in a summation unit 10 and that the sum signal is converted into radiofrequencies in a conversion unit 11 before being amplified by an amplifier 12 in order to be sent to mobile stations attached to said base station by means of an antenna 13.

In such a telecommunications system for mobile telephones, power control means are also provided so that the signal received by a mobile station is of constant power, despite the attenuation of the propagation channel between it and the base station. For example, each mobile station $SM_i$ sends a command signal $TPC_i$ which represents a request for increase or decrease, on the part of the base station, of the transmission power intended for it. In FIG. 1, power control units $14_1$ to $14_N$ are provided for respectively receiving the command signals $TPC_1$ to $TCP_N$ sent by mobile stations $SM_1$ to $SM_N$ and for modifying, before their application to the corresponding inputs of the summation unit 10, the input signals $e_1$ to $e_N$ in accordance with the requests of these command signals $TPC_1$ to $TCP_N$.

Thus, the total power of the composite signal transmitted by the base station is the sum of the powers of the various signals (dedicated and common) which compose it. This power varies over time and depends at each instant on the number of mobile stations attached to said base station.

Furthermore, it should be noted that, in such a telecommunications system, when the number of mobile stations attached to a base station becomes larger and larger, the overall level of interference between mobile stations increases. In this case, in order to keep the signal to interference ratio constant (which ensures a good quality of service level), the transmission power level of all the mobile stations is generally increased. Consequently, theoretically, the necessary total power level transmitted by the base station diverges towards infinity when the number of mobile stations attached to a base station approaches a limit value which is referred to as the maximum capacity of the base station.

The same phenomenon can be observed when the mobiles move away overall from the base station. The transmission power of the latter may also increase drastically.

However, the power which can be supplied by the power amplifier 12 of a base station of such a telecommunications system is necessarily limited, so that, when the number of mobile stations attached to said base station increases or when the mobiles move away overall from the base station, its output signal becomes saturated. What is more, the non-linearity of this amplifier causes a high distortion of the output signal before even reaching this saturation level. This leads to a break in communications for all the mobile stations against which it is important to protect.

A consequence of this is also a limitation of the coverage of the base station concerned.

In order to solve the problem which has just been explained, means have been proposed to ensure that the mean transmission power of the composite signal is always less than a critical predetermined value referred to subsequently as the operating power value. This operating value is for example equal to the saturation value of the power amplifier 12 decreased by a reduction value taking into account instantaneous fluctuations in the power of the composite signal around its mean value.

One known solution for implementing these means consists of using a power limiter which, at the time of saturation of the base station, acts on the composite signal so that its transmission power, after amplification, is less than a predetermined power. Yet this solution has the effect of uniformly affecting all the elementary signals forming the composite signal. Distortion of the composite signal is certainly avoided but the contribution to the transmitted power intended for a particular mobile station is necessarily less than that required by said mobile station. Thus, the drawback of such a solution lies in the fact that all the mobile stations are uniformly adversely affected in the quality of their transmission.

FIG. 2 depicts a system which uses means allowing the implementation of another known solution to the problem mentioned above. The same units as those which have already been depicted in FIG. 1 have the same references. This system has, in addition, limitation units $15_1$ to $15_N$ which act respectively on the elementary signals forming the composite signal. These units $15_1$ to $15_N$ are, for example, as is the case in FIG. 2, placed between the power control units $14_1$ and $14_N$ and the corresponding inputs of the summation unit 10.

The function of each unit $15_i$ is to modify the signal on its input so as to limit its mean contribution Pi to the power of the transmitted composite signal to a predetermined value Pi_max, the sum of these values Pi_max always being less than or equal to the value of the desired operating transmission power.

By virtue of this system, the elementary signals intended for one mobile station can saturate, without, for all that, having an impact on the elementary signals of the other mobile stations. Thus, in the event of saturation of the signals intended for a mobile station, the level of power it receives will not be sufficient to maintain the communication which will then be interrupted. However, the other mobile stations whose elementary signals are not saturated do not have to experience a break in communication.

One drawback of this procedure lies in the fact that it is necessary, upon the establishment of a new communication for a mobile station, to decide on the maximum value Pi_max allowed for its contribution to the transmission power of the base station to which it is attached, which is not in itself trivial since any decision has important repercussions on the capacity and extent of the coverage of the base station concerned. Furthermore, it is also still necessary to make sure that the sum of the maximum transmission powers Pi_max of the dedicated signals is definitely always less than the value of the operating power of the base station. This requires a planning unit in the network which proves costly and difficult to maintain, especially when communications are switched from one base station to another during movement of the mobile.

It should be noted that this procedure is based on the fact that the power of the composite signal is equal to the sum of the powers of the elementary signals forming this composite signal. However, the contribution of power of each elementary signal to the transmission power of the base station being limited by its maximum power Pi_max, the transmission power of the composite signal is limited by the sum of these maximum power contributions. In practice, the power contributions of the elementary signals are not all at their maximum values at the same time. For example, only the signals intended for the mobile stations at the edge of the coverage circle can be at their maximum power level at the same time, whereas the signals intended for the mobile stations close to the base station will be transmitted at a lower power value. Thus, even at high load, the power of the composite signal is a long way from reaching its operating value, which will therefore practically never be used.

The aim of the present invention is therefore to propose a procedure which does not have the drawbacks mentioned above of the procedures of the state of the art. In particular, it is to propose a procedure which makes it possible to make best use of the power of the base station while avoiding phenomena of distortion, under-use of the radio capacity, and too weighty power planning installations in the network.

SUMMARY OF THE INVENTION

To that end, the present invention concerns a system for controlling the transmission power of a base station with which a number of mobile stations are in communication, said base station having power command units which receive respectively the signals intended for said mobile stations and power command signals sent by said mobile stations for commanding the contribution of said signal to the transmission power of said base station, and a summer for forming a composite signal from said signals delivered by said power command units. This control system is characterized in that said base station has summation units, the input signals of a given priority level being applied to the inputs of each summation unit which then delivers a sub-composite signal to the input of an attenuation unit whose output is connected to the input of said summer, each attenuation unit being designed to attenuate, by a variable attenuation coefficient, the sub-composite signal at its input when the transmission power of said base station exceeds a predetermined power, said attenuation coefficient being larger the lower the corresponding input signal priority level.

According to another characteristic of the invention, said attenuation coefficient of each attenuation unit is a power P of a base attenuation coefficient, the value of P being identical for all said attenuation units.

According to another characteristic of the invention, each base attenuation coefficient is less than unity, the coefficient of an attenuation unit being closer to unity the higher the corresponding input signal priority level.

According to another characteristic of the invention, an input signal intended for a mobile station is assigned to a sub-composite signal at the beginning of the communication.

According to another characteristic of the invention, the assignment of an input signal intended for a mobile station to a sub-composite signal is modified only at the time of the arrival of at least one event which concerns only said mobile station.

According to another characteristic of the invention, said or each event is a change in type of service, reaching of the saturation level, or entry into soft handover of said mobile station.

The present invention also concerns a method of controlling the transmission power of the sending section of a base station which receives, on its inputs, input signals which are intended to be transmitted to mobile stations attached to said base station. According to the invention, such a method is characterized in that it consists of forming groups of input signals according to predetermined priority criteria assigned to said input signals and of forming, from said input signals of each group, sub-composite signals, of forming, from said sub-composite signals, a composite signal which is transmitted to said mobile stations, and in that it consists of attenuating said sub-composite signals so that the power of the composite signal is always less than a predetermined power level, the attenuation coefficients respectively applied to said sub-composite signals being different according to the sub-composite signals considered.

According to another characteristic of the invention, said attenuation coefficient applied to each sub-composite signal has a value which is greater the higher the priority level of the input signals from which it is formed.

According to another characteristic of the invention, the attenuation coefficients respectively applied to the sub-composite signals are a same power P of base attenuation coefficients, the variation of said attenuation coefficients being obtained by variation of said value of the power P.

According to another characteristic of the invention, the value of P is chosen so as to allow non-exceeding of the critical power level, the value just below, P-1, causing exceeding of said critical power level.

According to another characteristic of the invention, each base attenuation coefficient is less than unity, the coefficient of an attenuation unit being closer to unity the higher the corresponding input signal priority level.

According to another characteristic of the invention, an input signal intended for a mobile station is assigned to a group for forming a sub-composite signal at the beginning of the communication.

According to another characteristic of the invention, the assignment of an input signal intended for a mobile station to a group for forming a sub-composite signal is modified only at the time of the arrival of at least one event which exclusively concerns only said mobile station.

According to another characteristic of the invention, said or each event is a change in type of service, reaching of the saturation level, or entry into soft handover of said mobile station.

The characteristics of the invention mentioned above, as well as others, will emerge more clearly from a reading of the following description of an example embodiment, said description being given in relation to the accompanying drawings, among which:

DESCRIPTION OF EMBODIMENTS

Figure 1:
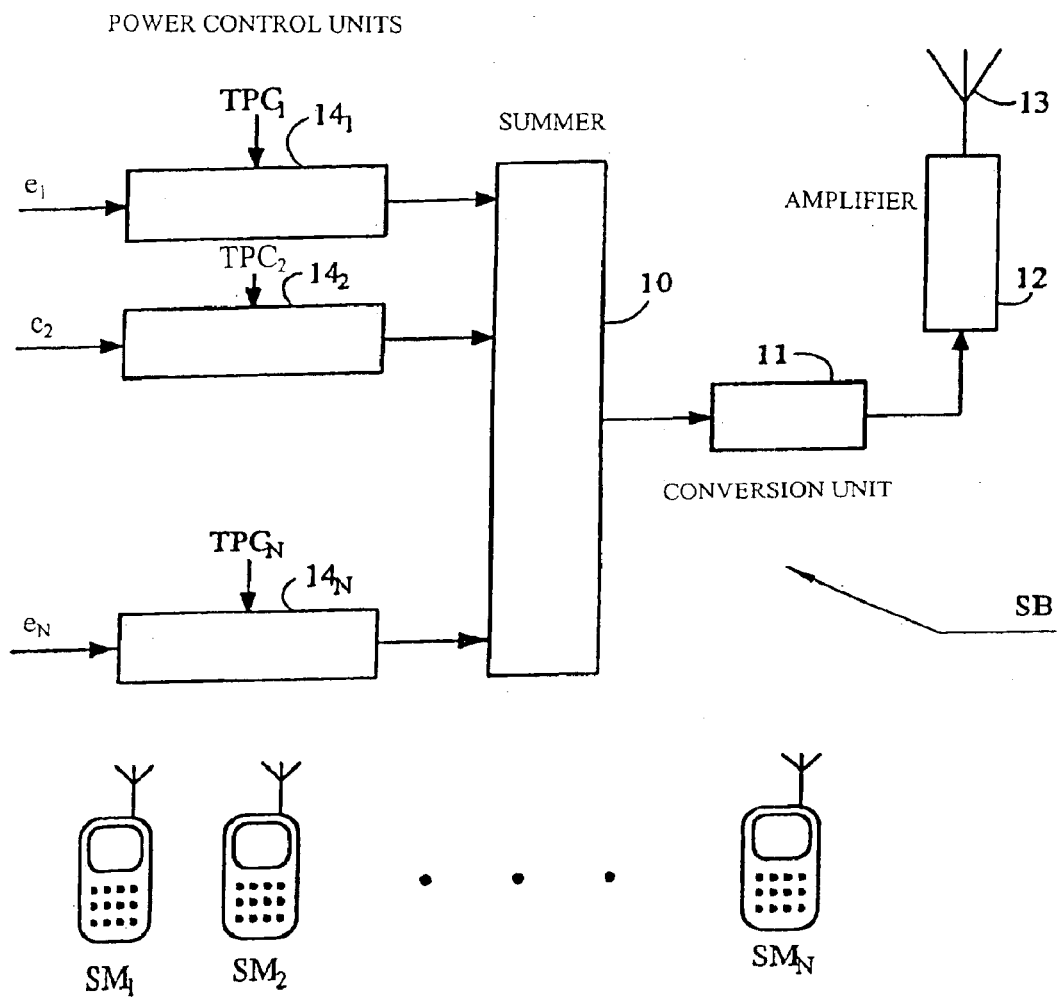
FIG. 1 is a schematic view of a communication system for mobile telephones, in particular of the sending section of a base station and of mobile stations.
Figure 2:
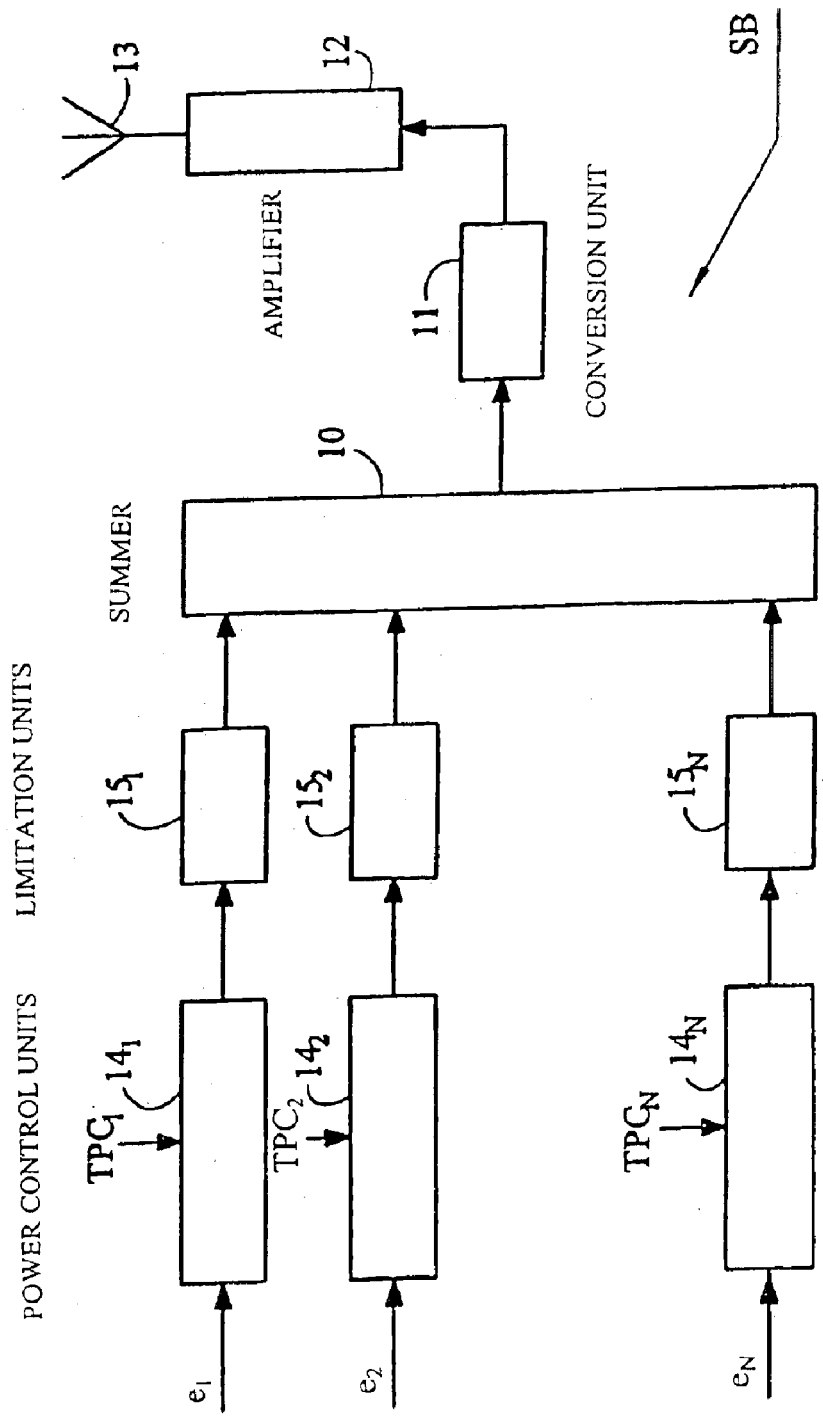
FIG. 2 is a schematic view of the sending section of a base station according to a second embodiment in accordance with the prior art.
Figure 3:
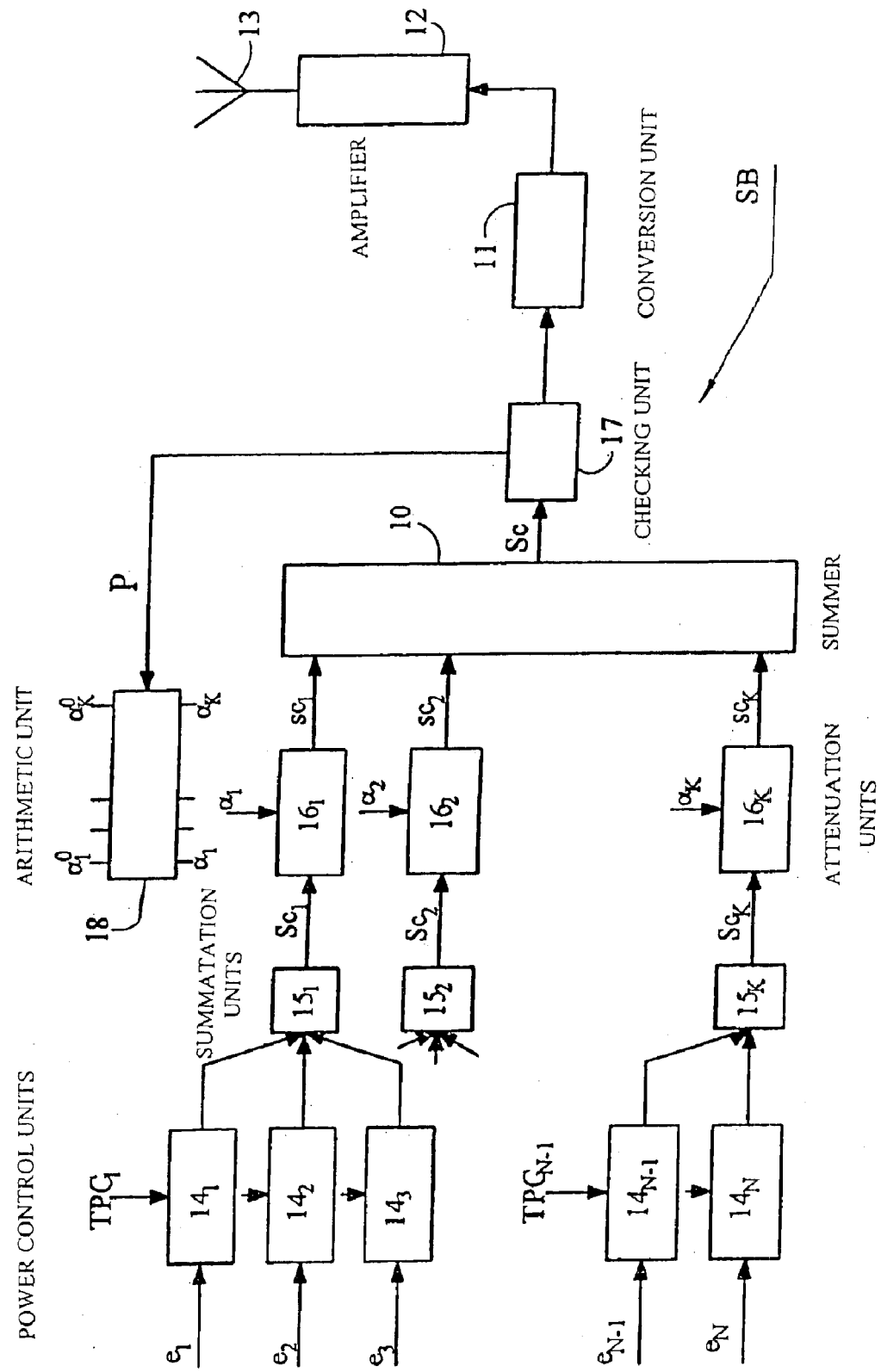
FIG. 3 is a schematic view of the sending section of a base station according to the present invention.

FIG. 3 shows the sending section of a base station SB which receives, on its inputs, input signals $e_1$ to $e_N$ which are intended to be transmitted to mobile stations $SM_1$ to $SM_M$ attached to said base station SB. These input signals $e_1$ to $e_N$ can be signals dedicated to any one mobile station but also signals intended for a set or for all the mobile stations $SM_1$ to $SM_M$.

According to the method of the present invention, groups of input signals are formed according to predetermined priority criteria assigned to these signals and the input signals of each group are summed so as to form sub-composite signals. The sub-composite signals thus formed are subject to respective attenuation processings before being summed to form a composite signal which is transmitted to said mobile stations. The attenuation processings implemented are designed so that the power of the composite signal is always less than a predetermined power referred to as the operating power of said base station, the attenuation coefficients being different according to the composites signals considered.

Thus, when the mean power of the composite signal becomes greater than the operating power, modifications can be made, different one from another, to the contributions of the sub-composite signals to the transmission power of the composite signal, that is to say the transmission power of the base station.

For the implementation of the method of the present invention which has just been explained, the sending section whose diagram is depicted in FIG. 3 is proposed.

This sending section has as many power control units $14_1$ to $14_N$ as input signals $e_1$ to $e_N$ which it is capable of sending to M mobile stations $SM_1$ to $SM_M$. It has summation units $15_1$ to $15_K$ so as to form K sub-composite signals $Sc_1$ to $Sc_K$ respectively applied to attenuation units $16_1$ to $16_K$.

On the inputs of each summation unit $15_1$ to $15_K$ there are applied input signals, forming a group of input signals, selected according to priority criteria. Each sub-composite signal is therefore assigned to a priority level.

On one input of each attenuation unit $16_1$ to $16_K$, there is applied the attenuation coefficient $\alpha_1$ to $\alpha_K$ to which the sub-composite signal on its input is subjected. This thus gives the signal at the output $sc_i$ of an attenuation unit $16_i$ which can be expressed as follows:

$$sc_i = \alpha_i \times Sc_i$$

Advantageously, each attenuation coefficient $\alpha_i$ has a value which is between 0 and 1.

Furthermore, the higher the priority level of a sub-composite signal $Sc_i$, the closer the coefficient $\alpha_1$ is to 1 and vice versa, the lower the priority level of a sub-composite signal $Sc_i$, the closer the coefficient $\alpha_i$ is to 0.

Once attenuated, the sub-composite signals $sc_i$ are applied to a summation unit 10 intended to form a composite signal Sc. As in the state of the art, the composite signal Sc is converted into radiofrequencies in a conversion unit 11 before being amplified by an amplifier 12 in order to be sent by means of an antenna 13.

With such a sending section, when, at a time t, the mean power of the composite signal becomes greater than a critical level, all the attenuation coefficients $\alpha_1$ to $\alpha_K$ are reduced, for example discretely, until a time when the power of the composite signal Sc becomes lower than the predetermined operating power.

Advantageously, the higher the priority level of a sub-composite signal $sc_i$, the less the coefficient $\alpha_i$ is reduced and vice versa, the lower the priority level of a sub-composite signal $sc_i$, the more the coefficient $\alpha_i$ is reduced.

Still advantageously and for implementation of the previous characteristic, the effective attenuation $\alpha_i$ applied to a sub-composite signal $Sc_i$ is equal to a $P^{th}$ power of a base attenuation $\alpha_i^0$, P being identical for the K sub-composite signals $Sc_1$ to $Sc_K$ (this therefore gives $\alpha_i = (\alpha_i^0)^P$).

Moreover, the value of P is greater than or equal to zero. Thus, it is by varying the value of P that the contribution to the transmission power of each sub-composite signal will be varied. This value of P is determined so that the power of the composite signal is substantially equal to the level of the operating power.

For example, the value of P will be chosen which results in the operating power not being exceeded but such that the choice of the value of P-1 in its place would have resulted in this operating power being exceeded.

It should be noted that, with this type of procedure, certain priority calls may never be saturated (for example where the base coefficient $\alpha_i^0$ is chosen equal to one). This procedure nevertheless makes it possible that non-priority calls can, all the same, get through, for example when the communication can be carried out by means of another non-saturated base station (the case of a call in soft handover), or when the communication can be carried out a little later.

According to the embodiment depicted in FIG. 3, the system of the present invention has a checking unit 17 which receives, on its input, the composite signal issuing from the summer 10 and which delivers the value of P to an arithmetic unit 18 designed to determine the coefficients $\alpha_1$ to $\alpha_K$ from base coefficients $\alpha_1^0$ to $\alpha_K^0$.

When the composite signal Sc has a power which exceeds the operating power, the checking unit 17 increments the value of P, the consequence of which is an increasing of the attenuation coefficients $\alpha_1$ to $\alpha_K$ and therefore of the sub-composite signals $sc_1$ to $sc_K$. When it is at a level less than this critical level, it decrements the value of P, the effect of which is a decreasing of the attenuation coefficients $\alpha_1$ to $\alpha_K$ and therefore of the sub-composite signals $sc_1$ to $sc_K$.

The allocation, to a given call, of one priority level rather than another and, consequently, the allocation of the input signals $e_i$ which are intended for it, to a group for forming a sub-composite signal $sc_j$, will be carried out by considering the calls already in saturation and the calls which are not, by differentiating calls according to the number of base stations involved in their soft handover phases and/or by differentiating connection type calls from packet type calls.

According to another method of the invention, a call is assigned to a priority level at the beginning of the communication. Its membership of one group for forming a sub-composite signal rather than another is modified only according to exceptional events which exclusively concern only said call. These may be, for example, a change in type of service, the arrival at its saturation level of said call, its entry into soft handover phase, the variation in the number of base stations to which the corresponding mobile station is attached in handover phase, etc. The calls are therefore assigned to a sub-composite signal independently of what takes place for the other calls.

The present invention allows an optimum effective use of the power of the base station when it becomes saturated. It does not require, unlike the systems of the state of the art, rapid refreshing of the maximum power levels among all the signals, nor a joint determination of these levels. This is because the base coefficients are determined in advance by the network operator.

What is claimed is:

1. In a system for controlling the transmission power of a base station configured to communicate with a plurality of mobile stations, said base station comprising:
   a plurality of power command units each configured to receive a signal intended for one of said plurality of mobile stations and a power command signal sent by one of said plurality of mobile stations;
   a plurality of summation units each configured to form a sub-composite signal from a group of input signals having a given priority level transmitted by the plurality of power command units;
   a plurality of attenuation units each configured to attenuate the sub-composite signal transmitted by respective one of the plurality of summation units by applying respective attenuation coefficients; and
   a summer configured to form a composite signal to be transmitted to said plurality of mobile stations from signals transmitted by the plurality of attenuation units,
   wherein the attenuation coefficient of each of the plurality of attenuation units is a power P of a base attenuation coefficient, the value of P being identical for all said attenuation units, and
   wherein the value of the attenuation coefficient of each of the plurality of attenuation units is less than one, the value of the attenuation coefficient of each of the plurality of attenuation units being closer to one for sub-composite signals having high priority level.

2. A system for controlling the transmission power of a base station according to claim 1, wherein an input signal intended for a mobile station is assigned to a sub-composite signal at the beginning of the communication.

3. A system for controlling the transmission power of a base station according to claim 1, wherein an input signal intended for a mobile station is assigned to a sub-composite signal, the input signal being modified only at the time of the arrival of at least one event related to said mobile station.

4. A system for controlling the transmission power of a base station according to claim 3, wherein the at least one event is a change in type of service, reaching of the saturation level, or entry into soft handover of said mobile station.

5. A system for controlling the transmission power of a base station according to claim 1, wherein the value of attenuation coefficient is large for sub-composite signals having a high priority level.

6. A system for controlling the transmission power of a base station according to claim 1, wherein the value of attenuation coefficient is small for sub-composite signals having a low priority level.

7. A method for controlling the transmission power of a base station configured to communicate with a plurality of mobile stations, comprising:
   forming groups of input signals according to predetermined priority criteria assigned to said input signals;
   forming respective sub-composite signals from said input signals of each group;
   attenuating said sub-composite signals by applying respective attenuation coefficients; and
   forming a composite signal from said attenuated sub-composite signals which is transmitted to said mobile stations, the composite signal being always less than a predetermined power,
   wherein the attenuating comprises:
      attenuating said sub-composite signals by selecting a larger value for said attenuation coefficient for the sub-composite signal formed from the input signals having a high priority level,
      attenuating said sub-composite signals by selecting the attenuation coefficients having a same power P of a base attenuation coefficient, the variation of said attenuation coefficients being obtained by variation of said value of the power P, and
      attenuating said sub-composite signals by selecting the value of the base attenuation coefficient so that the value of the attenuation coefficient of each of the plurality of attenuation units is less than one, and is closer to one for sub-composite signals having a high priority level.

8. A method for controlling the transmission power of a base station according to claim 7, wherein the attenuating comprises attenuating said sub-composite signals by selecting the value of P so as not to exceed said predetermined power.

9. A method for controlling the transmission power of a base station according to claim 7, wherein the forming of groups comprises forming of groups of input signals by assigning an input signal intended for a mobile station to a group for forming a sub-composite signal at the beginning of the communication.

10. A method for controlling the transmission power of a base station according to claim 7, wherein the forming of groups comprises forming of groups of input signals by assigning an input signal intended for a mobile station to a group for forming a sub-composite signal, and modifying the input signal only at the time of the arrival of at least one event related to said mobile station.

11. A method for controlling the transmission power of a base station according to claim 10, wherein the modifying comprises modifying the input signal only at the time of a change in type of service, reaching of the saturation level, or entry into soft handover of said mobile station.

* * * * *